April 13, 1954     J. F. DEXTER     2,675,421
INSULATED ELECTRIC COIL AND METHOD OF MAKING THE SAME
Filed Sept. 15, 1950     2 Sheets-Sheet 1
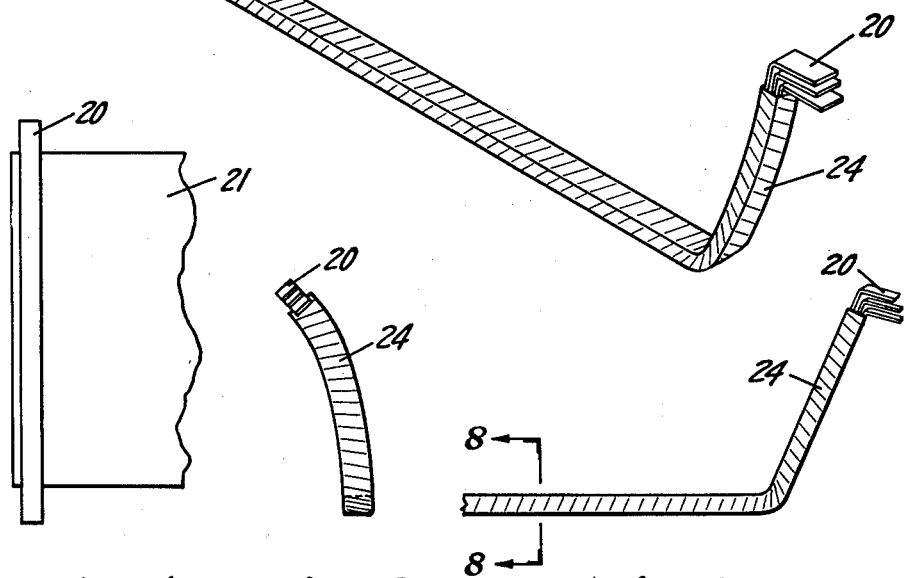
Fig. 4     Fig. 3     Fig. 2
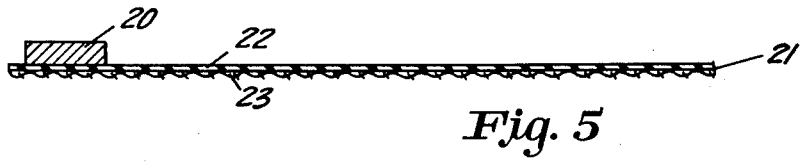
Fig. 5
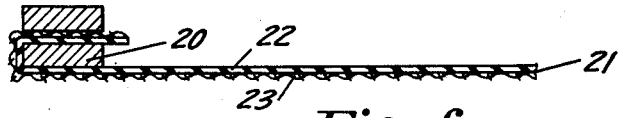
Fig. 6
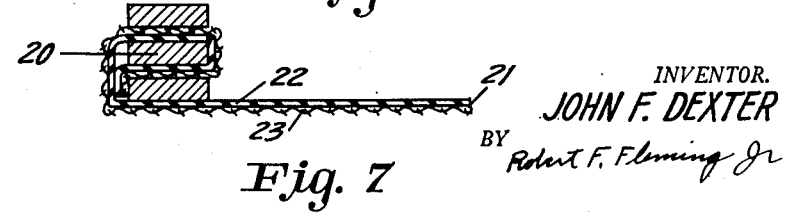
Fig. 7
INVENTOR.
JOHN F. DEXTER
BY Robert F. Fleming Jr
ATTORNEY April 13, 1954 J. F. DEXTER 2,675,421
INSULATED ELECTRIC COIL AND METHOD OF MAKING THE SAME
Filed Sept. 15, 1950 2 Sheets-Sheet 2

INVENTOR.
JOHN F. DEXTER
BY Robert F. Fleming Jr.

ATTORNEY

Patented Apr. 13, 1954

2,675,421

UNITED STATES PATENT OFFICE 2,675,421

INSULATED ELECTRIC COIL AND METHOD OF MAKING THE SAME

John F. Dexter, Midland, Mich., assignor to Dow Corning Corporation, Midland, Mich., a corporation of Michigan Application September 15, 1950, Serial No. 185,029

14 Claims. (Cl. 174—117)

The present invention relates to insulated coils for use in electric machines and an improved method for their manufacture.

At present, insulated coils such as armature and stator coils for use in electric machines such as motors and generators are prepared by bending the individual un-insulated conductors to the desired shape, and then individually wrapping each conductor with a tape comprising the desired type of insulation. These insulated conductors are then assembled in the required number and the assembly is wound with the insulating tape. Manufacturing the coils in this manner is time-consuming and expensive. A great deal of individual attention and manual control is necessary in order to obtain a satisfactory product, and completely mechanical methods for tape winding the shaped coil conductors have not been practiced.

It is an object of the present invention to provide improved methods for the manufacture of insulated coils for electric machines, to provide improved methods of insulating conductors, and to provide improved armature and stator coils of reduced cost. Other objects and advantages will be apparent from the following description.

A preferred form of the present invention is shown in the accompanying drawings in which:

Fig. 1 is a perspective of an armature coil side in accordance herewith;

Fig. 2 is a side view of a portion of the armature coil side;

Fig. 3 is an end view of the coil side;

Fig. 4 is an elevation of an unbent conductor bar in position to be wrapped with an insulating sheet;

Figure 8:
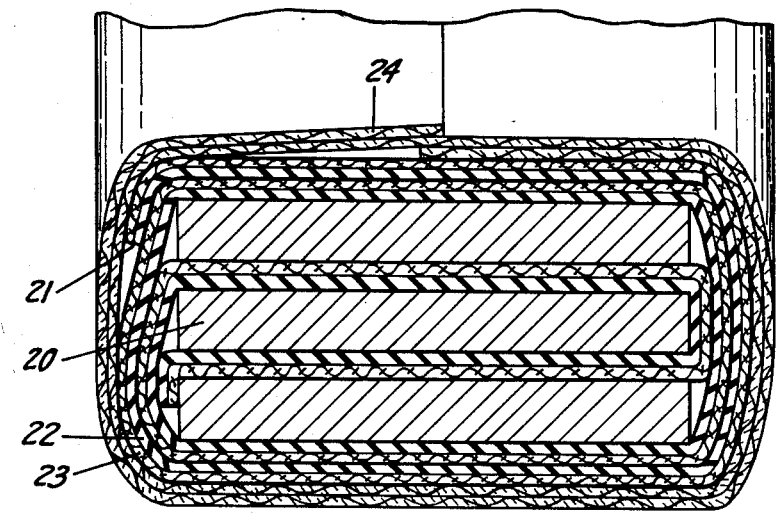
Figure 9:
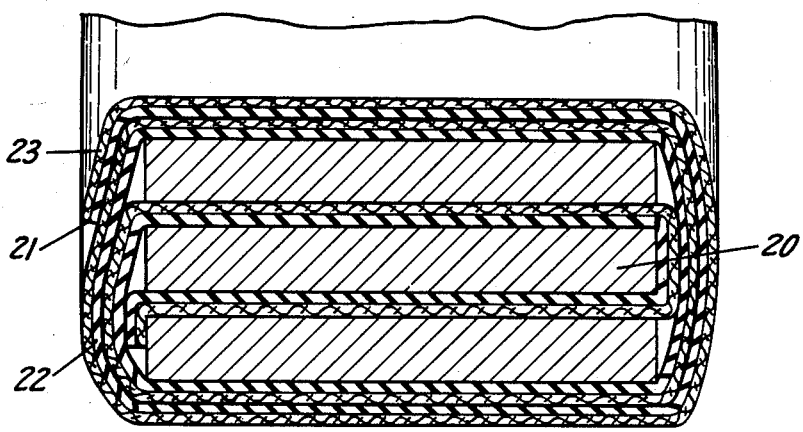

Figs. 5, 6, and 7 are sections showing progressive steps in wrapping a plurality of conductors;

Fig. 8 is a section of the armature coil side along the line 8, 8 of Fig. 2; and Fig. 9 is a section of a modified armature coil side along the line 8, 8 of Fig. 2.

In an embodiment of this invention, a metallic conductor 20 is wrapped with an insulating sheet 21, which is substantially the width of the portion of the conductor desired to be insulated. The insulating sheet is composed of a woven glass cloth 23 coated on one side only with a resilient vulcanizable electrical insulation 22. The woven glass cloth must be cut on the bias with respect to the longitudinal axis of the conductor, i. e. both the warp and fill threads of the cloth must make less than a 90° angle with said longitudinal axis, and the coated side of the cloth must be toward the conductor being wrapped.

A preferred method of wrapping is illustrated in Figs. 5, 6, and 7, where the first conductor 20 is wrapped through an angle of 180°, the second conductor is positioned parallel to the first and both are wrapped through a 180° angle, and the third conductor is positioned parallel and adjacent to the first for further wrapping.

This procedure can be continued for any further number of conductors desired, or may be modified by making more than one wrapping on each conductor before proceeding to the next. The resulting assembly is one in which the first conductor wrapped is in contact on all sides with the resilient vulcanizable electrical insulation 22, but each additional conductor has at least one side in contact with the woven glass cloth 23. A section of a wrapped armature coil side containing three conductors is illustrated in Fig. 9, in which the glass cloth 23 and the insulation 22 are both exaggerated for purposes of clarity.

In one embodiment of the invention, the assembly as illustrated in Fig. 9 is pressed in a heated mold of suitable size, causing the outside dimensions of the coil to conform to the desired size and shape. This hot pressing also causes the resilient vulcanizable electrical insulation 22 to flow so as to fill any existing voids, and vulcanizes said insulation into a monolithic layer. The straight coil side is then bent by any suitable means to the desired shape. Wrapping the conductors in the novel manner provided by this invention allows the bending of the wrapped conductors to be executed without disrupting the integrity of the insulation, and without significantly altering the dielectric strength of the insulation in the area in which the bend is made.

In another preferred embodiment of the invention, the unpressed wrapped conductors are further wound with a glass cloth tape 24. This tape is impregnated with a flexible binding resin. The impregnation may be conducted either prior or subsequent to the application of the tape. The tape is preferably half-lapped around the insulated conductors, giving an assembly as illustrated in section in Fig. 8. In this case hot pressing may be utilized to both vulcanize the insulation and cure the binding resin. The impregnated glass cloth tape 24 increases the mechanical strength and resistance to wear of the insulating sheet. After hot pressing the straight coil side, it can be bent into the desired shape by any suitable means.

The preferred type of resilient vulcanizable electrical insulation for the purpose of this invention is siloxane rubber. The siloxane rubbers are well known articles of commerce. Their preparation and fabrication are disclosed in French Patent No. 929,522 assigned to the Corning Glass Works, and by Servais, Rubber Age, vol. 58, No. 5, February 1946, pp. 579–584. Other types of insulation may be used however, such as for example natural rubber, synthetic rubber, and resilient synthetic resins having electrical insulation properties.

The glass cloth sheet forming a base for the resilient insulation must be on the bias in respect to the longitudinal axis of the conductors wrapped therein. Preferably the warp threads of the aforesaid glass cloth should make approximately a 45° angle with said longitudinal axis, particularly if rather sharp bends are to be made in the wrapped conductors. However, if the amount of bending required is not so great, angles of from 20° to 70° are satisfactory. It is preferable that this glass cloth sheet be in the range of from 0.002 to 0.020 of an inch in thickness.

The composite insulating sheet may be prepared by forming a coating of the resilient vulcanizable electrical insulation on one side of the glass cloth, and partially curing the insulation by any suitable means. The resilient insulation should preferably be in a slightly tacky but non-flowing condition prior to its use in wrapping the conductors, but it should not be cured to such an extent that it is not capable of further vulcanization, and preferably should be capable of at least a slight flow upon the application of heat and pressure. The thickness of said resilient insulation is not critical, and may be varied to suit specific needs, but a thickness of from 0.005 to 0.030 of an inch has been found to be particularly suitable.

After the conductors have been wrapped with the composite insulating sheet, it is sometimes desirable to wind them additionally with a glass cloth tape impregnated with a flexible binding resin. This serves to increase the strength and resistance to wear of the final asembly. The binding resin is preferably a heat stable, electrically insulating, moisture repellent resin. It should be capable of being cured to a flexible condition, non-tacky at temperatures likely to be encountered in the operation of the armature coil. The organosiloxane resins, such as the alkyl, aryl, alkaryl, and aralkyl siloxanes and mixtures thereof, are particularly suitable as said binding resins. Such siloxane resins are well known commerically available materials. Of course other well known binding resins, both synthetic and natural, may be used if desired.

In a specific embodiment of the invention, a glass cloth sheet of 0.004 inch thickness was coated on one side only with a paste made from 105 parts by weight of a dimethylpolysiloxane fluid having a viscosity of 15,000 centistokes at 25° C., parts by weight of $TiO_2$, and 5 parts by weight of benzoyl peroxide. The coated sheet was cured at 130° C. for 15 minutes, giving a slightly tacky composite sheet having a nominal thickness of 0.015 inch. This sheet was cut on the bias and then used to wrap three copper conductor bars 20 in the manner illustrated in Figs. 4, 5, 6, and 7, giving an assembly in which there was one layer of the insulating sheet 21 between each of the bars, with a double layer of insulating sheeting around the outside of the assembly as illustrated in Fig. 9. The bars were each approximately 0.084 inch thick, 0.575 inch wide, and 30 inches long. The biased cut of the insulating sheet caused the warp threads of the glass cloth therein to make an angle of about 45° with the longitudinal axis of each conductor bar. The wrapped bars were then wound in a half-lap fashion with a glass cloth tape 24 (0.005 inch thick, 1.0 inch wide) which had been impregnated with an organopolysiloxane resin containing $(C_6H_5CH_3SiO)$, $(C_6H_5SiO_{1.5})$, and $$(CH_3SiO_{1.5})$$

units.  The taped assembly was pressed in a mold for 10 minutes at a temperature of 200° C. and a pressure of approximately 50 pounds per square inch. Upon removal from the mold, the assembly was bent to conform with the shape of the armature coil side illustrated in Figs. 1, 2, and 3. There was no apparent disruption of the integrity of the insulation, even in the area of the sharpest curvature. Dielectric strengths were determined at various points throughout the length of the slot and nose sections of the coil side, and in the area of curvature between said sections. The test was made by the method of ASTM D–149–44, using aluminum foil electrodes surrounding the insulated coil side at the points tested. The individual conductors were connected together and the test voltage was applied between the conductors and the aluminum foil electrode. The values obtained ranged from 10 to 10.6 kilovolts in the unbent portions of the coil side, and from 10.2 to 10.4 kilovolts in the areas of curvature, thus indicating that the insulation had remained intact when the assembly was bent. The dielectric strength between the individual conductors was obtained by applying the test voltage between the center conductor and each of the outer conductors. The values obtained ranged from 3 to 4 kilovolts, indicating no disruption of the integrity of the insulation.

That which is claimed is:

1. In the manufacture of an insulated electric coil for use in an electrical machine, the method comprising the steps of wrapping a plurality of metallic conductors with a continuous insulating sheet substantially the width of the portion of the conductor to be insulated, said insulating sheet being comprised of a woven glass cloth sheet coated on one side only with a resilient vulcanizable electrical insulating material, the coated side of said sheet being toward the conductors being wrapped and the sheet being positioned in such a manner that the woven glass cloth therein has a biased relationship to the longitudinal axis of the conductors, the wrapping being executed in such a manner that there is at least one layer of the insulating sheet between any two adjacent conductors, the first wrapped conductor in the assembly being in contact on all sides with the resilient vulcanizable insulating material and each additional conductor having at least one side in contact with the woven glass cloth, heating the assembly at a temperature sufficient to cure the resilient insulation, and thereafter bending the assembly to conform to the desired configuration.

2. The method of claim 1 in which the biased relationship of the woven glass cloth sheet to the metallic conductors is such that the warp threads of said cloth make an angle of from 20° to 70° with the longitudinal axis of the conductors.

3. The method of claim 1 in which the resilient vulcanizable electrical insulating material is comprised of a siloxane rubber.

4. The method of claim 1 in which the biased relationship of the woven glass cloth sheet to the metallic conductors is such that the warp threads of said cloth make an angle of from 20° to 70° with the longitudinal axis of the conductors and in which the resilient vulcanizable electrical insulating material is comprised of a siloxane rubber.

5. In the manufacture of an insulated electric coil for use in an electrical machine, the method comprising the steps of wrapping a plurality of metallic conductors with a continuous insulating sheet substantially the width of the portion of the conductor to be insulated, said insulating sheet being composed of a woven glass cloth sheet coated on one side only with a resilient vulcanizable electrical insulating material, the coated side of said sheet being toward the conductors being wrapped and the sheet being positioned in such a manner that the woven glass cloth therein has a biased relationship to the longitudinal axis of the conductors, the wrapping being executed in such a manner that there is at least one layer of the insulating sheet between any two adjacent conductors, the first wrapped conductor in the assembly being in contact on all sides with the resilient vulcanizable insulating material and each additional conductor having at least one side in contact with the woven glass cloth, winding the wrapped assembly with a glass cloth tape impregnated with a binding resin, heating the assembly at a temperature sufficient to cure the resilient insulation, and thereafter bending the assembly to conform to the desired configuration.

6. The method of claim 5 in which the biased relationship of the woven glass cloth sheet to the metallic conductors is such that the warp threads of said cloth make an angle of from 20° to 70° with the longitudinal axis of the conductors.

7. The method of claim 5 in which the resilient vulcanizable electrical insulating material is comprised of a siloxane rubber and the binding resin is comprised of an organosiloxane resin.

8. An assembly of a plurality of insulated electrical conductors for use in an electric coil, said assembly being capable of being bent to conform to a desired configuration after having been insulated without disrupting the integrity of the insulation, comprising a plurality of metallic conductors surrounded by a heat cured continuous insulating sheet substantially the width of the insulated portion of each conductor, said insulating sheet being comprised of a woven glass cloth sheet coated on one side only with a resilient vulcanizable electrical insulating material, the coated side of said sheet being toward the conductors and the insulating sheet being positioned such that the woven glass cloth therein has a biased relationship to the longitudinal axis of the conductors, there being at least one layer of the insulating sheet between any two adjacent conductors, and the first wrapped conductor in the assembly being in contact on all sides with the resilient vulcanizable insulating material, each additional conductor having at least one side in contact with the glass cloth.

9. The assembly of claim 8 in which the biased relationship of the woven glass cloth sheet to the metallic conductors is such that the warp threads of said cloth make an angle of from 20° to 70° with the longitudinal axis of the conductors.

10. The assembly of claim 8 in which the resilient vulcanizable electrical insulating material is comprised of a siloxane rubber.

11. An assembly of a plurality of insulated electrical conductors for use in an electric coil, said assembly being capable of being bent to conform to a desired configuration after having been insulated without disrupting the integrity of the insulation, comprising a plurality of metallic conductors surrounded by a heat cured continuous insulating sheet substantially the width of the insulated portion of each conductor, said insulating sheet being comprised of a woven glass cloth sheet coated on one side only with a resilient vulcanizable electrical insulating material, the coated side of said sheet being toward the conductors and the insulating sheet being positioned such that the woven glass cloth therein has a biased relationship to the longitudinal axis of the conductors, there being at least one layer of the insulating sheet between any two adjacent conductors, the first wrapped conductor in the assembly being in contact on all sides with the resilient vulcanizable insulating material, each additional conductor having at least one side in contact with the woven glass cloth, and a glass cloth tape impregnated with a binding resin surrounding the aforesaid insulating sheet.

12. The assembly of claim 11 in which the biased relationship of the woven glass cloth sheet to the metallic conductors is such that the warp threads of said cloth make an angle of from 20° to 70° with the longitudinal axis of the conductors.

13. The assembly of claim 11 in which the resilient vulcanizable electrical insulating material is comprised of a siloxane rubber, the binding resin is comprised of an organosiloxane resin, and in which the biased relationship of the woven glass cloth sheet to the metallic conductors is such that the warp threads of said cloth make an angle of from 20° to 70° with the longitudinal axis of the conductors.

14. The insulated assembly of claim 13 in which the biased relationship of the woven glass cloth to the metallic conductors is such that the warp threads of said cloth make an angle of about 45 degrees with the longitudinal axis of the conductors.

References Cited in the file of this patent

UNITED STATES PATENTS

| Number | Name | Date |
|---|---|---|
| 269,735 | Speicher | Dec. 26, 1882 |
| 1,757,030 | Watson et al. | May 6, 1930 |
| 1,913,889 | Kitsee | June 13, 1933 |
| 1,946,190 | Brodhun | Feb. 6, 1934 |
| 2,202,820 | Baird et al. | June 4, 1940 |
| 2,234,560 | Keyes | Mar. 11, 1941 |
| 2,258,218 | Rochow | Oct. 7, 1941 |
| 2,557,928 | Atkinson | June 26, 1951 |

OTHER REFERENCES

Larsen et al., March issue of Modern Plastics, vol. 23, No. 7, pp. 160 to 162, 92 to 94.